United States Patent
Wang

(10) Patent No.: US 12,257,746 B2
(45) Date of Patent: Mar. 25, 2025

(54) METHOD OF PRODUCING CONTAINER PRODUCT

(71) Applicant: Chih-Chen Wang, Tainan (TW)

(72) Inventor: Chih-Chen Wang, Tainan (TW)

(*) Notice: Subject to any disclaimer, the term of this patent is extended or adjusted under 35 U.S.C. 154(b) by 65 days.

(21) Appl. No.: 18/318,793

(22) Filed: May 17, 2023

(65) Prior Publication Data
US 2024/0383177 A1    Nov. 21, 2024

(51) Int. Cl.
*B29C 44/04*      (2006.01)
*B29C 44/08*      (2006.01)
(Continued)

(52) U.S. Cl.
CPC .......... *B29C 44/04* (2013.01); *B29C 44/0415* (2013.01); *B29C 44/08* (2013.01);
(Continued)

(58) Field of Classification Search
CPC .......... B29C 44/00; B29C 44/025–027; B29C 44/04; B29C 44/0407; B29C 44/0415; B29C 44/043; B29C 44/0438; B29C 44/0446; B29C 44/08; B29C 44/083; B29C 44/10; B29C 44/105; B29C 44/3419; B29C 44/3438; B29C 44/3442; B29C 44/3446; B29C 44/36; B29C 44/362; B29C 44/38; B29C 44/388; B29C 44/365; B29C 44/367; B29C 44/42; B29C 44/428; B29C 44/56; B29C 44/586; B29C 44/588; B29C 44/022; B29C 44/086; B65D 81/3811; B65D 81/3823; B65D 81/3874; B65D 81/3886; B65D 81/3867; B65D 1/14; B65D 1/16; B65D 1/165; B65D 1/40; B32B 5/14; B32B 5/142; B32B 5/145; B32B 5/147; B32B 5/18; B32B 5/32; B32B 23/048; B32B 25/045; B32B 27/065; B32B 37/06; B32B 37/08; B32B 38/0036; B32B 38/0084; B32B 2439/00; B32B 2250/22;
(Continued)

(56) References Cited

U.S. PATENT DOCUMENTS 3,703,255 A * 11/1972 Wade ..................... B65D 1/265
                                                          264/550
5,985,191 A * 11/1999 Clarke ................... B29C 44/083
                                                          264/55
(Continued)

Primary Examiner — Jeffrey M Wollschlager
Assistant Examiner — Edgaredmanuel Troche
(74) Attorney, Agent, or Firm — Best & Flanagan LLP

(57) ABSTRACT

A method of producing a container product comprises providing a mold including a first part and a second part. The mold is closed to define a cavity having a first area and a second area. A molten plastic composition including a polymer and a physical blowing agent is filled into the cavity. Then, the molten plastic composition in the cavity is cooled, such that the molten plastic composition in the first area is completely cooled and solidifies or a central portion of the first area has micro uncooled molten plastic composition. The second area has the plastic composition in the molten state. The first part of the mold is moved in the axial direction. The molten plastic composition in the second area forms a beehive foam after foaming and expansion. Then, the foamed container product in the mold is cooled to take shape and then removed after opening the mold.

7 Claims, 4 Drawing Sheets

(51) Int. Cl.
  *B29C 44/10* (2006.01)
  *B29C 44/34* (2006.01)
  *B29C 44/42* (2006.01)
  *B29C 44/58* (2006.01)
  *B29K 23/00* (2006.01)
  *B29K 105/04* (2006.01)
  *B29L 31/00* (2006.01)

(52) U.S. Cl.
  CPC .......... *B29C 44/083* (2013.01); *B29C 44/086* (2013.01); *B29C 44/10* (2013.01); *B29C 44/105* (2013.01); *B29C 44/3415* (2013.01); *B29C 44/42* (2013.01); *B29C 44/586* (2013.01); *B29C 44/3465* (2013.01); *B29C 44/585* (2013.01); *B29C 44/588* (2013.01); *B29K 2023/12* (2013.01); *B29K 2105/04* (2013.01); *B29L 2031/7132* (2013.01); *Y10S 220/902* (2013.01); *Y10S 220/903* (2013.01)

(58) Field of Classification Search
  CPC ...... B32B 2266/00–10; B29K 2023/12; B29K 2105/04–048; B29L 2031/7132; Y10S 220/902; Y10S 220/903
  USPC ... 264/41, 45.2, 48, 50, 51, 54–55, DIG. 83; 521/50
  See application file for complete search history.

(56) References Cited

U.S. PATENT DOCUMENTS

| | | | |
|---|---|---|---|
| 6,402,725 B1* | 6/2002 | Clarke | B29C 44/04 |
| | | | 30/340 |
| 11,446,849 B2 | 9/2022 | Clarke | |
| 2009/0104420 A1* | 4/2009 | Nadella | B29C 44/0484 |
| | | | 428/218 |
| 2020/0156853 A1* | 5/2020 | Clarke | B29C 44/06 |

* cited by examiner

METHOD OF PRODUCING CONTAINER PRODUCT

BACKGROUND OF THE INVENTION

The present invention relates to a method of producing a container product and, more particularly, to a method of producing a cup-shaped container product formed from a polymer and a blowing agent through melting and formation.

Currently available plastic cups made by injection molding are disposable. To reduce the costs, the plastic cup may have a thickness only sufficient to receive a beverage. However, a thin plastic cup has poor thermal insulation, such that when the thin plastic cup receives a hot drink, the temperature transferred to the outer side of the cup will cause discomfort to the hand of the user.

To improve the poor thermal insulation of the plastic cup, plastic cups are currently formed from a molten plastic composition consists of a polymer and a blowing agent. After formation, a plastic cup of a thicker foam can be formed, providing a thermal insulating effect better than plastic cups without foaming.

However, the plastic cup of a thicker foam throughout the structure has a monotonous appearance. U.S. Pat. No. 11,446,849 discloses a plastic cup in which the temperature control includes local cooling at a portion of the mold, such that the cooled region does not foam, whereas the uncooled region foams, thereby forming a plastic cup with a foamed portion and an unfoamed portion. However, the local cooling approach increases complexity in production and is difficult to control.

BRIEF SUMMARY OF THE INVENTION

A method of producing a container product according to the present invention comprises providing a mold including a first part and a second part. The first part includes a first surface. The second part includes a second surface. The second part includes an air blowing port.

Then, the mold is closed. The first surface and the second surface define a cavity which includes a substantially conic annular cavity portion. The annular cavity portion includes a first end and a second end spaced from the first end in an axial direction and having a diameter smaller than a diameter of the first end. The second end includes a bottom cavity portion extending perpendicularly to the axial direction. The cavity includes a first area and a second area. A spacing between the first surface and the second surface in the first area is smaller than a spacing between the first surface and the second surface in the second area. The second area has two ends spaced in the axial direction and connected to the first area, respectively.

Next, a molten plastic composition including a polymer and a physical blowing agent is filled into the cavity under an injection pressure.

Then, the molten plastic composition in the cavity is cooled, such that the molten plastic composition in the first area is completely cooled and solidifies or a central portion of the first area has micro uncooled molten plastic composition. The second area has a first solid surface layer and a second solid surface layer respectively contacting with the first surface and the second surface. The first solid surface layer and the second solid surface layer receive the plastic composition in the molten state. The molten plastic composition in the cavity is exposed to a first pressure greater than a gas pressure, of the physical blowing agent, which keeps the physical blowing agent dissolved in the polymer, such that the molten plastic composition in the first area and the second area does not foam.

Next, air is blown into the air blowing port to make the plastic composition adhere to the first surface of the first part and then stops blowing the air. The first part of the mold is moved in the axial direction. The molten plastic composition in the cavity is exposed to a second pressure smaller than the gas pressure keeping the physical blowing agent dissolved in the polymer, such that the spacing between the first surface and the second surface in the second area is increased. The first solid surface layer still contacts with the first surface. An intermediate portion of the molten plastic composition is received in the second area and forms a beehive foam after foaming and expansion. The second solid surface layer is in contact with the second surface. The plastic composition in the first area contacts with the first surface and solidifies or only forms a micro foam, such that a shape and a thickness of the first area are substantially unchanged or the thickness of the first area is only slightly increased. The first area restricts the plastic composition in the second area to expand only toward the second surface.

Then, the foamed container product in the mold is cooled to take shape.

Next, the first part is disengaged from the second part of the mold, and the container product is removed.

In an example, the first area includes the bottom cavity portion and a portion of the annular cavity portion extending from the first end towards but spaced from the second end. The second area is located in the annular cavity portion and extends from the first area to the bottom cavity portion.

In an example, the first area and the second area are cooled at the same temperature during cooling of the molten plastic composition.

In an example, when cooling the foamed container product in the mold, the first area and the second area are cooled at the same temperature or naturally cooled at the room temperature.

The method according to the present invention does not need different temperature control in different areas, reducing the manufacturing complexity while providing better quality, higher yield rate, and product consistency. The container produced by the method according to the present invention includes an annular wall and a bottom wall below the annular wall. An opening is formed in an upper end of the annular wall. The annular wall is conic and substantially tapers from the opening to the bottom wall. The top portion of the annular wall and the bottom wall are a micro foaming region corresponding to the first area of the mold. A foaming region between the micro foaming region at the top portion of the annular wall and the bottom wall corresponds to the second area of the mold. The thickness of the foaming region is larger than the thickness of the micro foaming region while improving the appearance quality of the product of container. Furthermore, the thicker micro foaming region may provide a better thermal insulation effect.

The present invention will become clearer in light of the following detailed description of illustrative embodiments of this invention described in connection with the drawings.

DETAILED DESCRIPTION OF THE INVENTION

Figure 1:
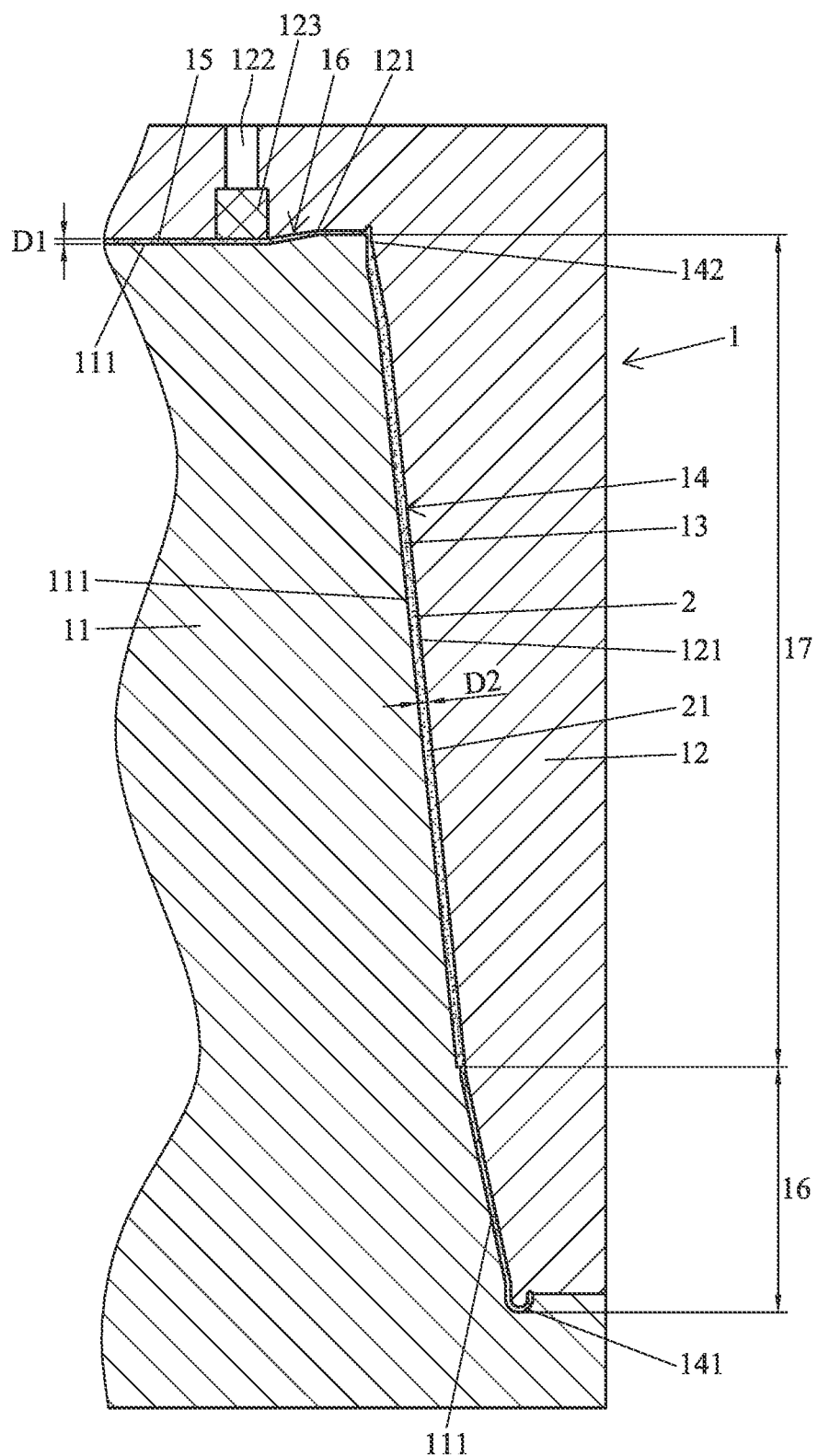
FIG. 1 is a schematic cross sectional view illustrating a mold filled with a molten plastic composition for producing a container product according to the present invention.
Figure 2:
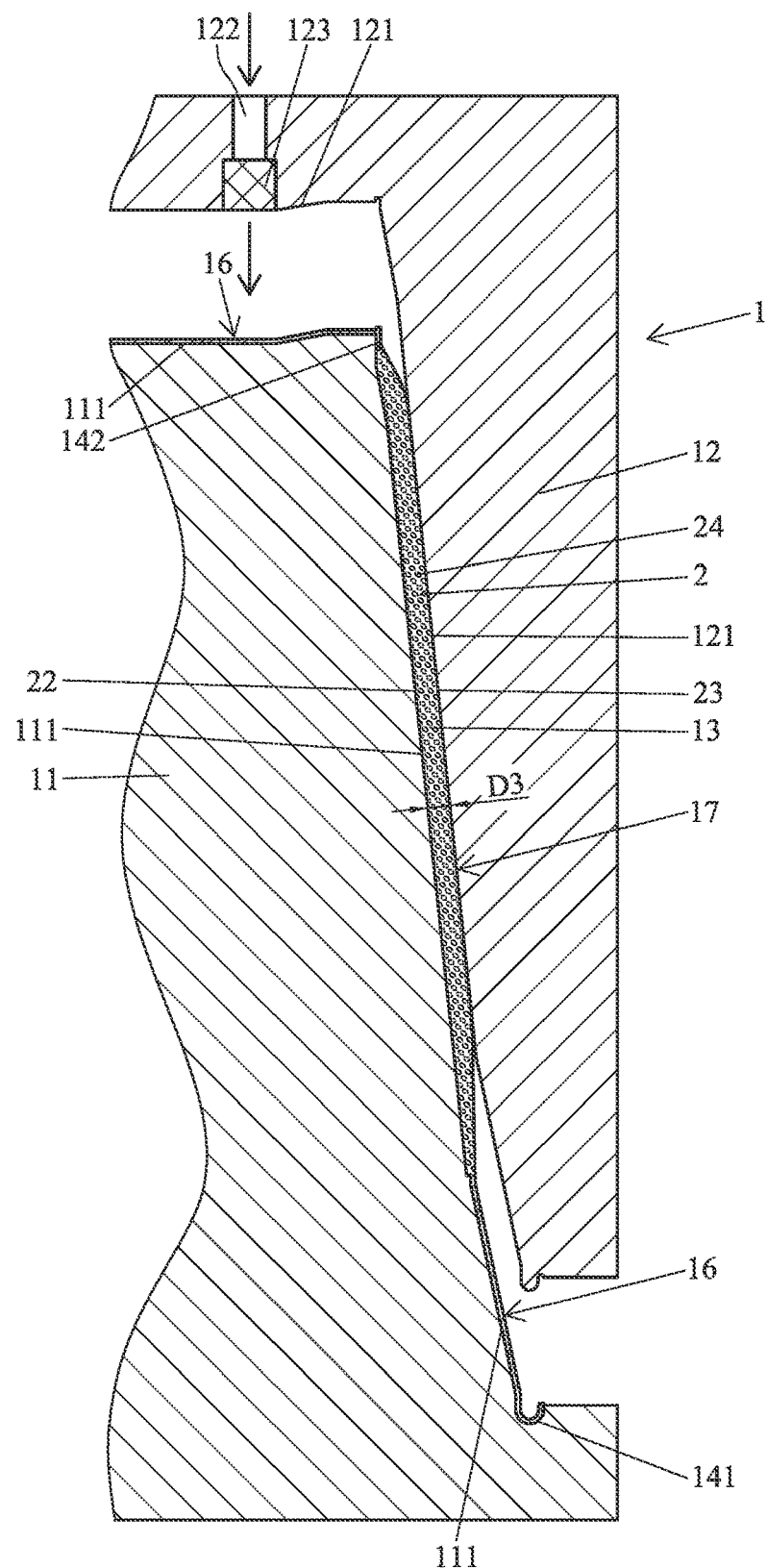
FIG. 2 is a schematic cross sectional view similar to FIG. 1 with a first part of the mold displaced in an axial direction.
Figure 3:
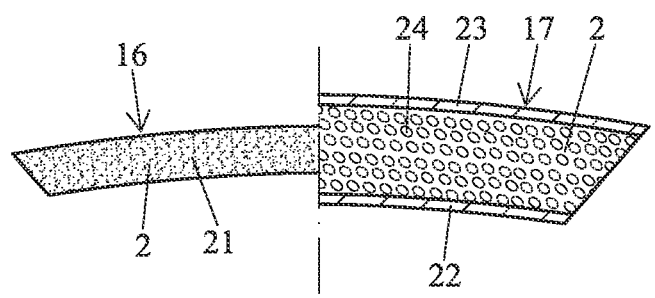
FIG. 3 is a schematic cross sectional view illustrating micro foaming in a first area and foaming in a second area of the container product according to the present invention.
Figure 4:
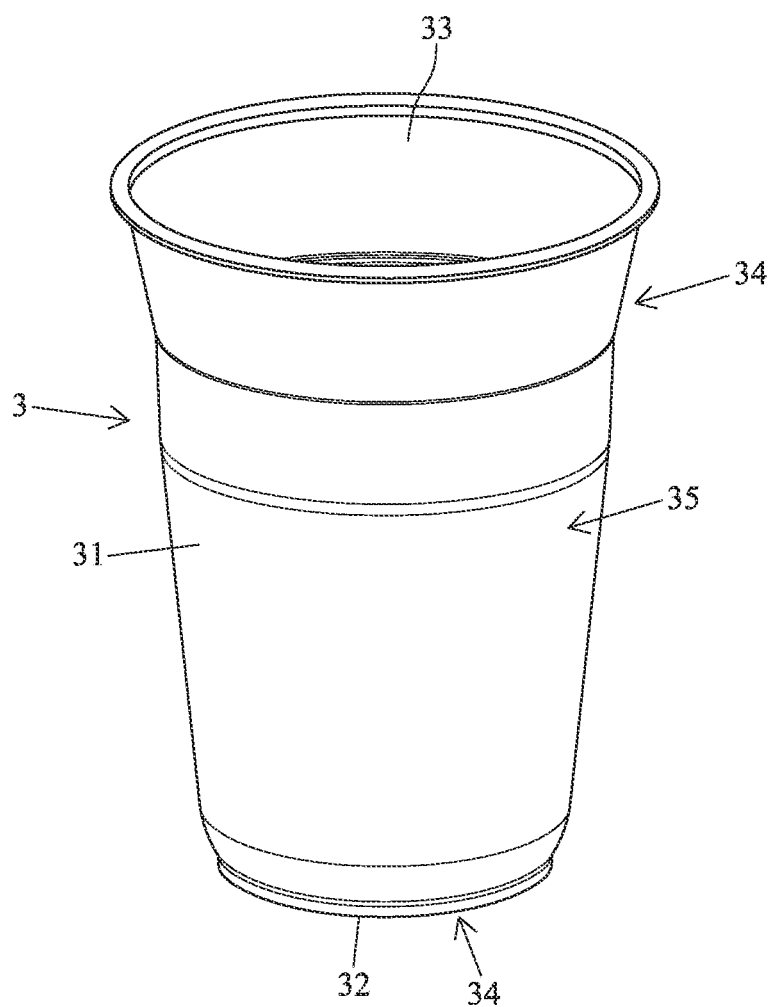
FIG. 4 is a schematic perspective view of the container product according to the present invention.

With reference to FIGS. 1-3, a method of producing a container product according to the present invention comprises providing a mold 1 including a first part 11 and a second part 12. The first part 11 includes a first surface 111. The second part 12 includes a second surface 121. The second part 12 includes an air blowing port 122. A gas-permeable block 123 is disposed in the air blowing port 122 and faces the second surface 121.

Then, the mold 1 is closed. The first surface 111 and the second surface 121 define a cavity 13 which includes a substantially conic annular cavity portion 14. FIGS. 1 and 2 only show a portion of the mold 1 in cross section. The annular cavity portion 14 includes a first end 141 and a second end 142 spaced from the first end 141 in an axial direction and having a diameter smaller than a diameter of the first end 141. The second end 142 includes a bottom cavity portion 15 extending perpendicularly to the axial direction. The air blowing direction of the air blowing port 122 faces the bottom cavity portion 15. The cavity 13 includes a first area 16 and a second area 17. The second area 17 has two ends spaced in the axial direction and connected to the first area 16. In this embodiment, the first area 16 includes the bottom cavity portion 15 and a portion of the annular cavity portion 14 extending from the first end 141 towards but spaced from the second end 142. The second area 17 is located in the annular cavity portion 14 and extends from the first area 16 to the bottom cavity portion 15. A spacing D1 between the first surface 111 and the second surface 121 in the first area 16 is smaller than a spacing D2 between the first surface 111 and the second surface 121 in the second area 17. In this embodiment, the spacing D1 may be about 0.5 mm, and the spacing D2 may be about 1 mm.

Next, a molten plastic composition 2 including a polymer and a physical blowing agent is filled into the cavity 13 under an injection pressure. The physical blowing agent is a gas 21 dissolved in the polymer. The polymer may be polypropylene. The blowing agent may be nitrogen. The gas-permeable block 123 can prevent the molten plastic composition 2 from flowing into the air blowing port 122.

Then, the molten plastic composition 2 in the cavity 13 of the mold 1 is cooled, such that the molten plastic composition 2 in the first area 16 is completely cooled and solidifies or a central portion of the first area 16 has micro uncooled molten plastic composition 2. As shown in FIGS. 2 and 3, the second area 17 has a first solid surface layer 22 and a second solid surface layer 23 respectively contacting with the first surface 111 and the second surface 121. The plastic composition 2 in the molten state is received between the first solid surface layer 22 and the second solid surface layer 23.

The molten plastic composition 2 in the cavity 13 is exposed to a first pressure greater than a gas pressure (of the physical blowing agent) which keeps the physical blowing agent dissolved in the polymer, such that the molten plastic composition 2 in the first area 16 and the second area 17 does not foam.

The first area 16 and the second area 17 are cooled at the same temperature. Since the first area 16 has a small thickness D1, the cooling temperature renders that the first area 16 completely solidifies, or most part of the first area 16 solidifies except the central portion of the first area 16 has micro uncooled molten plastic composition 2.

Next, air is blown into the air blowing port 122 to make the plastic composition 2 adhere to the first surface 111 of the first part 11 and then stops blowing the air. The first part 11 of the mold 1 is moved in the axial direction, and the molten plastic composition 2 in the cavity 13 is exposed to a second pressure smaller than the gas pressure (of the physical blowing agent) keeping the physical blowing agent dissolved in the polymer, such that the spacing D3 between the first surface 111 and the second surface 121 in the second area 17 is increased. At this time, the first solid surface layer 22 still contacts with the first surface 111. An intermediate portion of the molten plastic composition 2 is received in the second area 17 and forms a beehive foam 24 after foaming and expansion. The second solid surface layer 23 is in contact with the second surface 121. The movement travel of the first part 11 can restrict the shape and thickness of the second area 17. In this embodiment, the thickness D3 of the plastic composition 2 in the second area 17 may be about 2.3 mm after foaming.

Since the first area 16 solidifies or the central portion of the first area 16 only has micro molten plastic composition 2, only micro foaming can be formed. The plastic composition 2 in the first area 16 remains in contact with the first surface 111, but the plastic composition 2 in the first area 16 cannot expand to contact with the second surface 121. Therefore, the shape and the thickness of the first area 16 are substantially unchanged or only the thickness of the first area 16 is slightly increased. Furthermore, since the shape of the first area 16 is substantially fixed before movement of the first part 11, the plastic composition 2 in the second area 17 is restricted to foam and expand only toward the second surface 121, rather than expanding toward the axial direction of the mold 1, thereby increasing the stability of the shape of the container product.

Then, the foamed container product in the mold 1 is cooled to take shape. The first area 16 and the second area 17 are cooled at the same temperature or naturally cooled at the room temperature.

Next, the first part 11 and the second part 12 of the mold 1 are disengaged, and the container product is removed.

With reference to FIGS. 1-4, the container 3 produced by the method according to the present invention includes an annular wall 31 and a bottom wall 32 below the annular wall 31. An opening 33 is formed in an upper end of the annular wall 31. The annular wall 31 is conic and substantially tapers from the opening 33 to the bottom wall 32. A portion of the top portion of the annular wall 31 and the bottom wall 32 are a micro foaming region 34 corresponding to the first area 16 of the mold 1. A foaming region 35 between the micro foaming region 34 at the top portion of the annular wall 31 and the bottom wall 32 corresponds to the second area 17 of the mold 1. The thickness of the foaming region 35 is larger than the thickness of the micro foaming region 34 while improving the appearance quality of the product of container 3. Furthermore, the thicker foaming region 35 can provide a better thermal insulation effect.

The movement travel of the first part 11 of the mold 1 according to the present invention can control the foaming thickness of the foaming region 35 of the container 3, permitting easy control of the shape and thickness of the container 3. Furthermore, the method according to the present invention does not need different temperature control in different areas, reducing the manufacturing complexity while providing better quality, higher yield rate, and product consistency. Furthermore, the container 3 has the foaming region 35 and the micro foaming region 34 in different portions thereof, providing a better appearance quality.

Although specific embodiments have been illustrated and described, numerous modifications and variations are still possible without departing from the scope of the invention. The scope of the invention is limited by the accompanying claims.

The invention claimed is:

1. A method of producing a container product, the method comprising the ordered steps of:
   providing a mold comprising:
      a first part having a first surface; and
      a second part having a second surface and an air blowing port;
   closing the mold, wherein the first surface and the second surface define a cavity comprising:
      a first area having a first spacing between the first surface and the second surface;
      a second area connected to the first area, the second area having a second spacing between the first surface and the second surface, wherein the first spacing is smaller than the second spacing, the second area having two ends spaced apart in an axial direction; and
      a conic annular portion extending from the first area to the second area, the conic annular portion having a first end in the first area, a second end in the second area spaced from the first end in the axial direction, and a bottom portion at the second end, the bottom portion extending perpendicularly to the axial direction,
   filling a plastic composition in a molten state into the cavity under an injection pressure, wherein the plastic composition comprises a polymer and a physical blowing agent;
   cooling the plastic composition in the cavity from the molten state to at least a partially cooled state,
      wherein the plastic composition in the first area is at least substantially solidified,
      wherein the plastic composition in the second area has a first solid surface layer contacting with the first surface of the mold and a second solid surface layer contacting with the second surface of the mold, wherein the plastic composition is received between the first solid surface layer and the second solid surface layer,
      wherein the plastic composition is exposed to a first pressure greater than a gas pressure of the physical blowing agent, which keeps the physical blowing agent dissolved in the polymer, such that the plastic composition in the first area and the second area does not foam;
   blowing air into the air blowing port until the plastic composition adheres to the first surface of the first part,
      wherein the first part of the mold is moved in the axial direction, and the plastic composition is exposed in the cavity to a second pressure smaller than the gas pressure of the physical blowing agent to keep the physical blowing agent dissolved in the polymer, such that the second spacing increases, wherein the first solid surface layer remains in contact with the first surface,
      wherein, upon moving the first part of the mold in the axial direction, a portion of the plastic composition in the second area forms a beehive foam after foaming and radial expansion and the second solid surface layer is in contact with the second surface,
      wherein the plastic composition in the first area is in contact with the first surface and either solidifies or only forms a micro foam, such that a shape and a thickness of the first area are substantially unchanged or the thickness of the first area is only slightly increased, and
      wherein the first area restricts the plastic composition in the second area to expand only toward the second surface;
   cooling the plastic composition in the mold from the partially cooled state into a fully cooled state to form a container product; and
   disengaging the first part of the mold from the second part of the mold and removing the container product.

2. The method of producing the container product as claimed in claim 1, wherein the air is blown through the air blowing port toward the bottom portion.

3. The method of producing the container product as claimed in claim 1, wherein a gas-permeable block is disposed in the air blowing port and faces the second surface.

4. The method of producing the container product as claimed in claim 1, wherein the polymer is polypropylene.

5. The method of producing the container product as claimed in claim 1, wherein the blowing agent is nitrogen.

6. The method of producing the container product as claimed in claim 1, wherein the first area and the second area are cooled at a same temperature during cooling of the plastic composition from the molten state to at least the partially cooled state.

7. The method of producing the container product as claimed in claim 1, wherein when cooling the plastic composition from the partially cooled state into the fully cooled state, the first area and the second area are cooled at a same temperature or naturally cooled at a room temperature.

* * * * *